US012556430B2

(12) United States Patent
Rozendaal et al.

(10) Patent No.: US 12,556,430 B2
(45) Date of Patent: Feb. 17, 2026

(54) METHOD AND APPARATUS FOR CONTROLLING A TEMPORARY GATEWAY FOR AD-HOCK DATA NEEDS

(71) Applicant: SIGNIFY HOLDING B.V., Eindhoven (NL)

(72) Inventors: Leendert Teunis Rozendaal, Eindhoven (NL); Peter Deixler, Arlington, MA (US); Bozena Erdmann, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 248 days.

(21) Appl. No.: 17/764,702

(22) PCT Filed: Oct. 5, 2020

(86) PCT No.: PCT/EP2020/077810
§ 371 (c)(1),
(2) Date: Mar. 29, 2022

(87) PCT Pub. No.: WO2021/069357
PCT Pub. Date: Apr. 15, 2021

(65) Prior Publication Data
US 2022/0345982 A1    Oct. 27, 2022

Related U.S. Application Data

(60) Provisional application No. 62/912,112, filed on Oct. 8, 2019.

(30) Foreign Application Priority Data

Oct. 24, 2019  (EP) ..................................... 19205078

(51) Int. Cl.
*H04L 12/00* (2006.01)
*H04L 12/46* (2006.01)
(Continued)

(52) U.S. Cl.
CPC .......... *H04L 12/4633* (2013.01); *H04L 45/22* (2013.01); *H04W 40/22* (2013.01);
(Continued)

(58) Field of Classification Search
None
See application file for complete search history.

(56) References Cited

U.S. PATENT DOCUMENTS

2016/0014549 A1* 1/2016 Jones ..................... H04W 4/80
455/41.1
2016/0337971 A1* 11/2016 Bhargava .......... H04W 52/0216
(Continued)

FOREIGN PATENT DOCUMENTS

WO    2018228883 A1    12/2018
WO    2019048278 A1    3/2019

OTHER PUBLICATIONS

Mats Andersson, Sr. Dir. Tech., Prod. Center Short Range Radio, U-Blox. "Use Case Possibilities with Bluetooth Low Energy in IoT Applications", White Paper, www.u-blox.com, Dec. 5, 2014, pp. 1-16.
(Continued)

*Primary Examiner* — Brandon M Renner

(57) ABSTRACT

The present invention relates to a Zigbee or other multi-hop network that can become a bottleneck for certain applications, e.g. entertainment streaming to (multiple) areas in the areas (e.g. at home) where hopping is needed. By locally utilizing an temporary gateway (50) being present right in a data-hungry area, the overall performance across the network can be improved. Using this temporary gateway (50), (part of) the data can be routed 5 directly to/from the destination/source nodes (10, 40) thus freeing up capacity in the remainder of the network.

14 Claims, 3 Drawing Sheets

(51) Int. Cl.
  *H04L 45/00* (2022.01)
  *H04W 40/22* (2009.01)
  *H04W 48/16* (2009.01)
  *H04W 76/10* (2018.01)
  *H04L 67/10* (2022.01)
  *H04L 67/125* (2022.01)
  *H04W 88/16* (2009.01)

(52) U.S. Cl.
  CPC ........... *H04W 48/16* (2013.01); *H04W 76/10* (2018.02); *H04L 67/10* (2013.01); *H04L 67/125* (2013.01); *H04W 88/16* (2013.01)

(56) References Cited

U.S. PATENT DOCUMENTS

| | | | |
|---|---|---|---|
| 2019/0159044 A1 | 5/2019 | Abou-Rizk et al. | |
| 2021/0405962 A1* | 12/2021 | Mackay | H04N 21/8547 |
| 2023/0046739 A1* | 2/2023 | Sobol | H04L 41/16 |

OTHER PUBLICATIONS

Thomas Zachariah, et al., "The Internet of Things Has a Gateway Problem", University of Michigan, Ann Arbor, MI, USA, Electrical Engineering and Computer Science Department, HotMobile '15, Feb. 12-13, 2015, pp. 27-32.

* cited by examiner

METHOD AND APPARATUS FOR CONTROLLING A TEMPORARY GATEWAY FOR AD-HOCK DATA NEEDS

CROSS-REFERNCE TO PRIOR APPLICATIONS

This application is the U.S. National Phase application under 35 U.S.C. § 371 of International Application No. PCT/EP2020/077810, filed on Oct. 5, 2020, which claims the benefits of European Patent Application No. 19205078.9, filed on Oct. 24, 2019 and U.S. Application No. 62/912,112, filed on Oct. 8, 2019. These applications are hereby incorporated by reference herein.

FIELD OF THE INVENTION

The invention relates to a connected device system, for instance, a connected lighting or automation system, that is adapted to form a bandwidth-limited wireless mesh network between a plurality of devices. The invention further relates to a connecting device (e.g. a home-automation or lighting control bridge or gateway) for use in the connected device system and to a control method for controlling transmission over the connected device system.

BACKGROUND OF THE INVENTION

In a connected lighting system, a plurality of lighting devices may be connected to a controller device, such as a bridge device, via a wireless network. The light output of the lighting devices, which may typically include light emitting diodes (LEDs), can be controlled wirelessly via the controller device, for instance, with regards to their hue, saturation and/or brightness. To this end, a smartphone that can be connected to the controller device may execute a software application (e.g. an app) in order to wirelessly control the lighting devices via the controller device.

In many cases, such connected lighting systems are based on a bandwidth-limited wireless mesh network, such as the IEEE 802.15.4-based Zigbee network. Such networks are generally designed for carrying only smaller volumes of data.

(Wireless) lighting automation and control systems become more popular, both in consumer and in professional space. The centralized application architecture of such system suits the initial use cases but can become a bottleneck for some of the new use cases.

WO2018228883 A1 relates to a method to extend the coverage of a wireless single-hop network (e.g. BLE network) by relaying messages of the wireless single-hop network on a wireless multi-hop network (e.g. ZigBee mesh network), benefitting from a combined single-hop/multi-hop (e.g. BLE/ZigBee) capability of wireless combo devices which can seamlessly bridge between the two wireless networks.

WO2019048278 A1 is related to controlling commissioning of a combo network device in a multi-hop network by using a point-to-point connection.

SUMMARY OF THE INVENTION

It is an object of the present invention to improve throughput and/or latency for specific use cases in connected device systems.

Accordingly, a setup of a connection between a connecting device (e.g. bridge, gateway, hub, router, brouter, repeater, switch or the like) and at least one target device or directly to the at least one target device in a multi-hop network is controlled by detecting availability of at least one temporary gateway capable of connecting with a single-hop connection to the at least one target device or to a proxy device providing access to the at least one target device, and by deciding either to establish a bypass connection via a selected one of the at least one temporary gateway to the at least one target device or to the proxy device or to establish a connection to the at least one target device or the proxy device through the multi-hop network in dependence on at least one network or device-related parameter. The provision of additional interfaces on network devices (e.g. combo devices for multi-hop (e.g. Zigbee, Wi-Fi etc.) and single-hop connectivity (e.g. BLE etc.)) or the use of technology developed for entertainment or corresponding services with higher data rates are exploited to achieve lower latency (better synchronisation) and/or lower occupation of the multi-hop network. The proposed use of the bypass connection via Ethernet/Wi-Fi/LTE/5G and/or BLE and/or other network technology provides the advantage that less messages are sent via the multi-hop network or are sent over shorter distances only.

According to a first option, a combo device with single-hop and multi-hop connectivity may be activated as the proxy device located near the at least one target device for assisting in the connecting to the at least one target device. Thereby, an interface with single-hop connectivity can be established close to the at least one target device to thereby reduce latency and/or load of the multi-hop network.

According to a second option which can be combined with the first option, the selected temporary gateway may be controlled via an Ethernet or Wi-Fi or Thread or BLE connection. Such types of connections are usually available at connecting devices (such as bridge devices or the like), so that the proposed bypass connection can be established without substantial re-configuration of the connecting device.

According to a third option which can be combined with the first or second option, the selected temporary gateway may be controlled to take over functions of the proxy device and send and/or receive single-hop messages to/from the at least one target device. This option provides a straightforward solution to establish the bypass connection with little re-configuration effort. In a specific example, the selected temporary gateway may be controlled to package commands received from a connecting device in broadcast or unicast messages to be used as the single-hop messages.

According to a fourth option which can be combined with any one of the first to third options, the role of at least one target device may be changed to become an end device of the multi-hop network or enable a single-hop connectivity during a session of the bypass connection. Thereby, the single-hop connection from the selected temporary gateway to the at least one target device can be established in an efficient manner.

According to a fifth option which can be combined with any one of the first to fourth options, the selected temporary gateway and the at least one target device, or the selected temporary gateway, the proxy device and the at least one target device may be instructed, e.g. by the gateway device, to use the bypass connection and send messages via the selected temporary gateway. Thereby, setup of the bypass connection can be achieved quickly without requiring preparatory signaling between the selected temporary gateway and the target device.

According to a sixth option which can be combined with any one of the first to fifth options, availability of the at least one temporary gateway may be detected based on an information received at the apparatus from the proxy device to stop sending unicast messages over the multi-hop network. This provides a simple way to detect the temporary gateway.

According to a seventh option which can be combined with any one of the first to sixth options, the availability of the at least one temporary gateway may be detected based on at least one of proxy beacons having been observed via the temporary gateway, a control action having been executed by a user of the temporary gateway, a result of a proximity detection amongst the temporary gateway and at least one target device or the proxy device, or an explicit user indication. Thereby, detection of the temporary gateway does not require any specific two-way signaling between the connecting device and the temporary gateway or other network devices.

According to an eighth option which can be combined with any one of the first to seventh options, a first cellular device (e.g. smartphone or IoT device) may be selected as the selected temporary gateway and may use a second cellular device (e.g. smartphone or IoT device) for establishing the bypass connection. This provides the advantage that the fast cellular communication channel can be used as a part of the bypass connection.

According to a ninth option which can be combined with any one of the first to eighth options, the decision about the use of the bypass connection may be made in dependence on at least one of network load of the multi-hop network, local busyness of the multi-hop network at the at least one target device, number of network devices not supporting required features in a cluster comprising the at least one target device, number of messages expected to be sent in a unit of time, length of the messages, number of target devices within a one-hop range of the proxy device, number of target devices within a one-hop range of the connecting device, number of hops from the connecting device to the at least one target device or the proxy device, or importance of a message to be sent over the connection to be established. Thereby, it can be ensured that the selection of the bypass connection reduced latency and/or improves throughput of the multi-hop network.

According to a tenth option which can be combined with any one of the first to ninth options, a voice-controlled device (e.g. a voice assistant such as Google Home or Amazon Alexa) or a mesh router (e.g. a WiFi mesh router) can be selected as the selected temporary gateway and informed about the at least one target device and technical details how to control the at least one target device. This provides the advantage that the voice system can be used to directly control luminaire devices of a lighting system.

According to an eleventh option which can be combined with any one of the first to tenth options, a proxy device of the multi-hop network may be selected as the selected temporary gateway, wherein control commands for the at least one target device are packaged and sent in a single unicast message to the proxy device, and wherein the proxy device is controlled to spread the unicast message via a single-hop transmission to the at least one target device. Thereby, a connection via the multi-hop network can be used as a more efficient bypass connection by first carrying multiple control commands in a single unicast message and then forwarding the control commands to the target devices in a single-hop transmission.

The detection of and/or decision about the temporary gateway may be made at the connecting device or at other network devices (e.g. potential temporary gateway, target device, proxy device or another network device). That is, the apparatus may be provided at the connection device, at the temporary gateway, at the target device, at the proxy device or another network device of the multi-hop network. It is noted that the above apparatus may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a Zigbee network as an example of a multi-hop technology network. Moreover, in some embodiments, a Bluetooth Low Energy (BLE) connection is used as an example of a single-hop technology based point-to-point connection. According to various embodiments, data throughput (and/or latency) of specific use cases (e.g. entertainment streaming) can be improved by exploiting a bypass connection from a 'real' gateway to a temporary 'ephemeral' gateway which is connected to another node of the same wireless network as the real gateway.

In various embodiments of the present invention, BLE and Zigbee combined radio is used as an example for providing improved throughput and/or latency. However, the present invention is equally applicable to any other combination of single-hop technology (e.g. BLE, Infrared (IR), near field communication (NFC), wireless local area communication (Wi-Fi), cellular communication (e.g. 5G), Ultra-Wideband (UWB) technology etc.) with multi-hop technology (e.g. Zigbee, Thread, Bluetooth Mesh, Wi-Fi mesh, WirelessHART, SmartRF, CityTouch, IP500, and any other mesh or tree-based technology).

Figure 1:
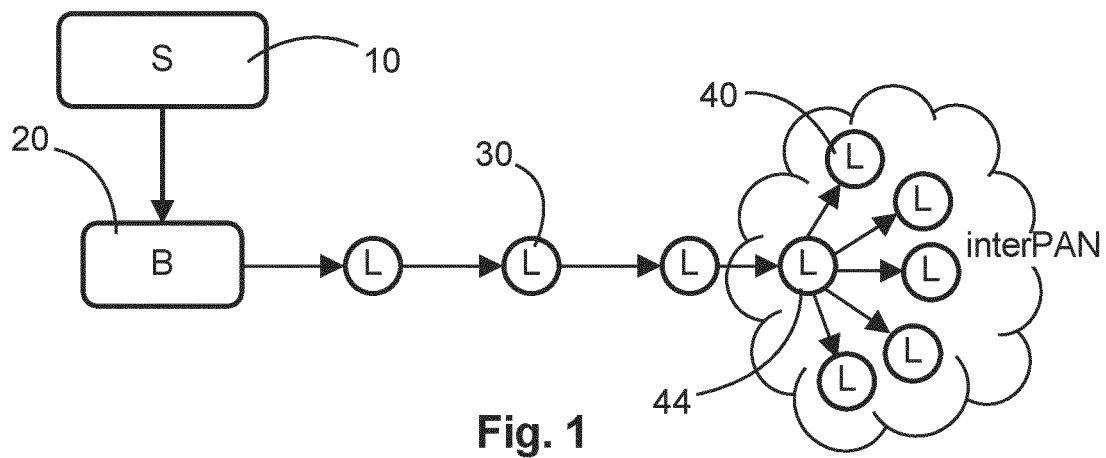
FIG. 1 shows a schematic architecture of a multi-hop lighting network for use in connection with various embodiments.

FIG. 1 shows a schematic architecture of a multi-hop Zigbee lighting network with a connecting device (B) 20

(such as a bridge or gateway or hub or switch or router or brouter or the like) connecting via a unicast hopping link over various luminaire devices (L) 30 to a proxy device 44 which may also be a luminaire device and which is configured to provide access to other luminaire devices 40 of a cluster.

A connected lighting system may consist of at least one smart luminaire device (e.g. light bulb) 40 and the connecting device 20 that is used e.g. as a Zigbee transceiver to communicate with the luminaire devices 30, 40. The connecting device 20 may connect to a home router (not shown) via Ethernet or Wi-Fi. Connected luminaire devices 30, 40 can be physically turned on and off using regular light switches (not shown). To turn on or off as well as to change color and brightness of the light, a manufacturer- or third-party app on a mobile device (not shown) (or a computer (not shown)) may be required. The user can use the app to send commands via the Internet and/or home router to the bridge, which translates the commands into Zigbee command frames and transmits them to the luminaire devices 30, 40.

As an example, entertainment streaming from an entertainment source 10 (i.e. data source) to multiple areas of a home (where hopping to the involved proxy device 44 may be needed), and with voice control systems (where the commands may have to travel through the connecting device 20 despite the voice assistant device being localized near the luminaire devices 40) can be provided. This could also apply to pushing a firmware upgrade (typically image sizes greater or equal 200 KB) from the connecting device 20 to device(s) in remote corners of the network. Another bandwidth-hungry use case is major reconfiguration of devices, e.g., all devices in an entire commercial building.

In various embodiments, the connecting device may be a central bridge that can stream lighting control information (i.e. the entertainment information) to the luminaire devices that are in the wireless multi-hop network.

In entertainment cases, one of the luminaire devices 40 of a cluster in the entertainment area is assigned as "proxy node", e.g. the proxy device 44 in FIG. 1. The connecting device 20 sends lighting commands for the cluster in a unicast message to the proxy 44 (e.g. using normal Zigbee unicast routing, if needed). The proxy device 44 then sends Inter-PAN (Personal Area Network) message(s) to the luminaire devices 40 in the cluster. Inter-PAN signaling is a form of broadcast which is not re-broadcast by the luminaire devices 40 or other type of nodes (i.e. single-hop broadcast). So, the message reaches all luminaire devices 40 or other nodes within a radio frequency (RF) range of the proxy device 44 but takes up only one RF message. If the single-hop broadcast shall contain devices not belonging to the cluster, some group addressing could be provided to allow the luminaire devices 40 to filter on reception.

If the cluster and the proxy device 44 are several hops away from the connecting device 20, quite some latency (and also total RF transmission time for all the messages involved) will build up.

An additional problem is that the available payload of the unicast Zigbee message to be delivered to the appointed proxy device 44 is, due to the overhead of all the headers and security, much smaller than the payload available in an Inter-PAN message. Thus, if the connecting device 20 cannot be a proxy device itself, but needs to tunnel the message over the Zigbee network to the proxy device 44, it can only provide smaller chunks of data. This will result in either smaller clusters, or less granularity of per-cluster control, or message fragmentation, leading to reduced quality of the entertainment streaming (e.g. in terms of reliability, synchronicity, and/or richness of effects).

Recent advances in integrated circuit design have made it possible to combine Bluetooth Low Energy (BLE) and Zigbee technology on a single radio chip, allowing a low-power/low-cost device to operate as part of both a BLE network and a Zigbee network at the same time, leveraging a single wireless radio module. This may be achieved by fast switching the BLE and Zigbee device operations over time such that the device remains connected and operates in both networks simultaneously. The possibility of providing a constrained device with combined Zigbee and BLE RF function (i.e. Zigbee/BLE combo device) operating simultaneously on a BLE and a Zigbee network opens up new solutions to improve the limitations of these existing technologies. An example of a BLE network may consist of a mobile telephone device as master, which can provide Internet connectivity to an ecosystem of resource constrained devices such as the luminaire devices 30, 40, sensors, wearables, and building automation devices.

As described below in more detail, the connecting device 20 can be adapted to provide a single-hop connection (point-to-point connection) over Bluetooth by activating a Zigbee-BLE combo device as a proxy device near the devices (e.g. luminaire devices of the cluster) that need to be controlled. If the proxy device is operational already, the connecting device 20 may just connect to it and use it. Thereby, the multi-hop path can be bypassed or tunnelled via the single-hop connection ("wormhole channel") to an ephemeral (i.e. temporary) gateway.

Figure 2:
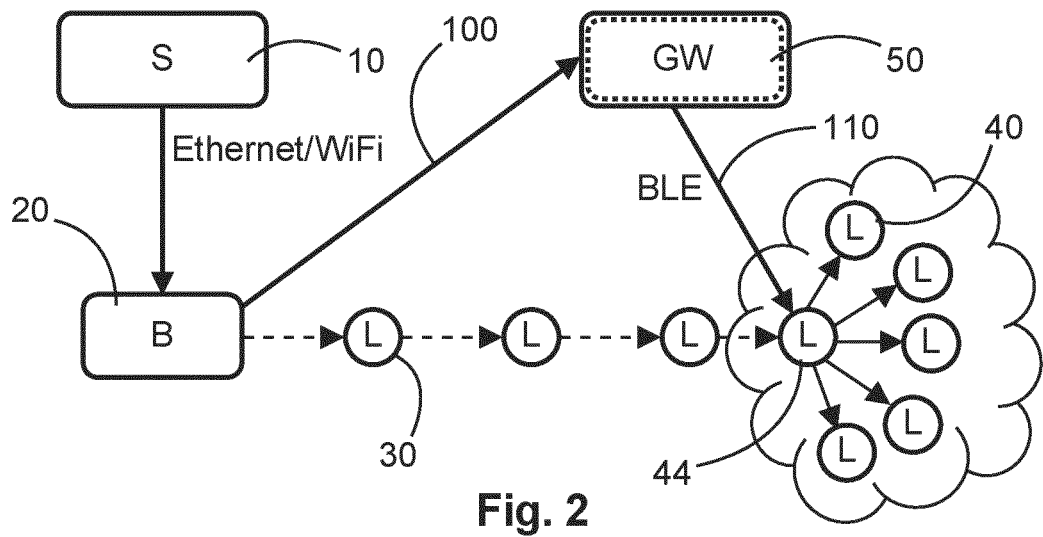
FIG. 2 shows a schematic architecture of a multi-hop lighting network with an temporary gateway according to a first embodiment.

FIG. 2 shows a schematic architecture of a multi-hop lighting network with an ephemeral gateway (GW) 50 according to a first embodiment.

It is noted that network components with identical reference signs are not described again here. They have same or similar structures and functions as those described above.

The ephemeral gateway 50 is connected to and controlled by the connecting device 20 via an Ethernet or Wi-Fi connection or link 100 and is connected to the proxy device 44 via a single-hop BLE connection or link 110. It could be implemented on a smartphone of a user who is in the entertainment area, so that streaming commands are sent by the connecting device 20 via this smartphone as ephemeral gateway 50 over the BLE connection 110 to the proxy device 44, which then forwards corresponding lighting commands in Zigbee Inter-PAN messages to the luminaire devices 40. So, the luminaire devices 40 receive the same lighting commands as before (cf FIG. 1), but the bypassing or tunnelling Ethernet or Wi-Fi link 100 to the ephemeral gateway 50 and the subsequent BLE link 110 to the proxy device 44 replaces the Zigbee hops via the luminaire devices 30. The connecting device 20 can decide to use the user's smartphone since it is very likely to be in the area where the user is enjoying the entertainment content to thereby reduce latency and network load.

A similar setup could be used if the luminaire devices 30, 40 are connected via a Wi-Fi-mesh or Thread or Bluetooth Mesh or any other broadcast or direct connection type rather than a Zigbee network, wherein at least one of the luminaire devices 40 has a mesh combo RF capability (e.g., Wi-Fi/BLE combo device) and acts as the proxy device 44, and the ephemeral gateway 50 (e.g. smartphone) uses the single-hop BLE link 110 to this proxy device 44 to feed the data into the cluster of luminaire devices 40 under control of the connecting device 20.

As an alternative, for this case, a Wi-Fi connection could be used instead of BLE for the link 110 if both the smartphone as ephemeral gateway 50 and the proxy device 44 have Wi-Fi capability.

The connecting device 20 may appoint the proxy device 44 to perform a particular task (e.g. get the energy consumption history for the last two years from particular node or a set of nodes) and send the results via the other interface (e.g. BLE).

Figure 3:
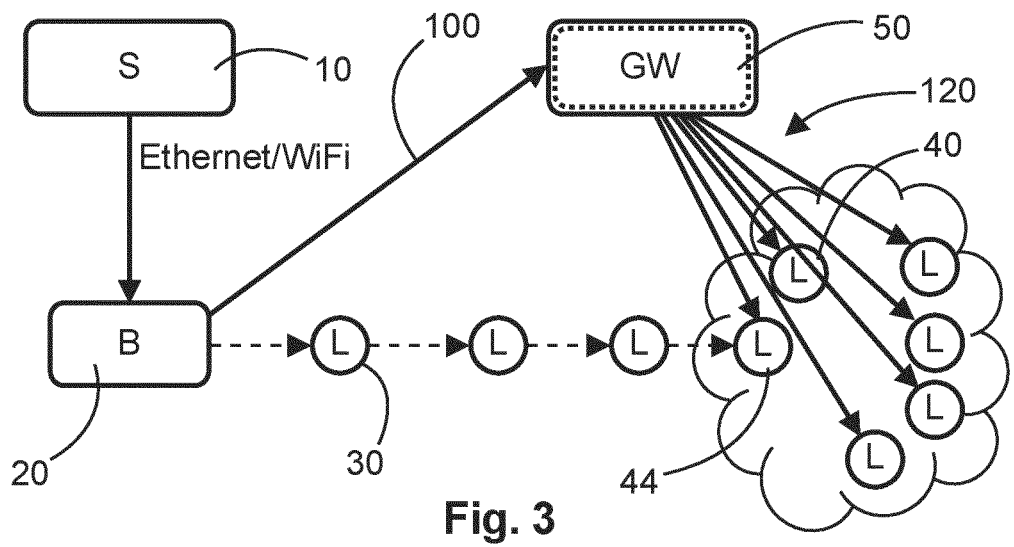
FIG. 3 shows a schematic architecture of a multi-hop lighting network with an temporary gateway as proxy according to a second embodiment.

FIG. 3 shows a schematic architecture of a multi-hop lighting network with an ephemeral gateway as proxy according to a second embodiment.

In the second embodiment, the ephemeral gateway 50 (e.g. smartphone) itself takes over the functions of the proxy device 44 (which is therefore no longer required), i.e., it is controlled by the connecting device 20 to send out messages 120 (e.g. Zigbee Inter-PAN (or Wi-Fi-mesh, Thread or Bluetooth Mesh or any other broadcast or direct connection type) commands) directly to the cluster of luminaire devices 40. This particular embodiment would require a Zigbee or Wi-Fi interface on the ephemeral gateway 50 (e.g. smartphone).

Another approach where the ephemeral gateway 50 takes over the functions of the proxy device 44 (under the assumption that all of the luminaire devices 40 in the entertainment area are BLE-capable) would be to use BLE messages as the messages 120, e.g. package the commands received from the connecting device 20 in BLE advertisements (so that all luminaire devices 40 of the cluster can receive the same message from the connecting device 20 via the ephemeral gateway 50), or sending individual BLE messages (unicast) as the messages 120 from the ephemeral gateway 50 to each of the luminaire devices 40.

To give the luminaire devices 40 sufficient "air time" to listen for BLE advertisements/messages, they could switch to become Zigbee end devices for the duration of the entertainment session, e.g., under control of the connecting device 20 or under control of the ephemeral gateway 50. Or, the luminaire devices 40 could be BLE-only devices. Or, the luminaire devices 40 could be Zigbee/BLE combo devices which (when entertainment streaming starts resp. the wormhole connection is enabled by the connecting device 20), disable their Zigbee part and function as a BLE-only device during the entertainment session—either until some "end" message is received, or with some timeout (watchdog) function where the normal operation (Zigbee) is resumed if no messages are received over the wormhole channel. Or, the luminaire devices 40 could retain their Zigbee role, but extend the time spent on the BLE connection at the cost of time spent at the Zigbee network.

Figure 4:
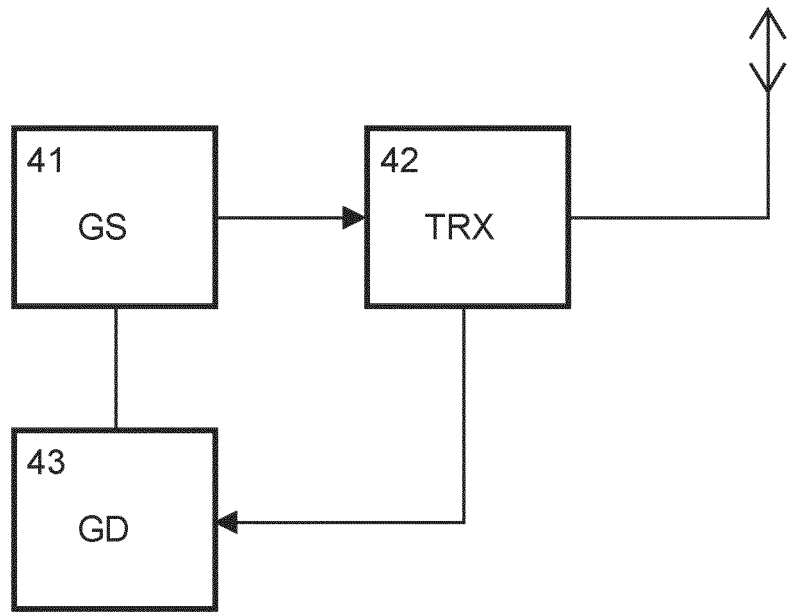
FIG. 4 shows a schematic block diagram of a connecting device according to various embodiments.

FIG. 4 shows a schematic block diagram of the connecting device 20 according to various embodiments, which may be provided in any of the architectures of FIGS. 2, 3, 6 and 7.

The connecting device 20 comprises a transceiver (TRX) 42 for transmitting and receiving messages to/from luminaire device(s) of the multi-hop network (e.g. Wi-Fi, Zigbee etc.) and to/from the ephemeral gateway 50 via a single-hop connection (e.g. Wi-Fi, Ethernet etc.). As an example, the transceiver 42 may comprise several RF units for enabling communication via different wired and/or wireless single-hop or multi-hop connections.

Furthermore, the connecting device comprises a gateway discovery unit (GD) 43 for discovering or detecting an availability (e.g. presence and/or location) of the ephemeral gateway 50 based on an information received from the ephemeral gateway 50 or the multi-hop network via the transceiver 42. When the gateway discovery unit 43 detects the availability of an ephemeral gateway (e.g. the ephemeral gateway 50), it provides a corresponding information to a gateway selection unit (GS) 41 adapted to select either the fast bypass or tunnel connection (i.e. wormhole channel) via the ephemeral gateway 50 to at least one target device of the cluster of luminaire devices 40 or the more constrained conventional multi-hop connection via the luminaire devices 30.

If the gateway discovery unit 43 of the connecting device 20 detects the presence and/or location (relative to the luminaire devices 30, 40 in the multi-hop lighting network and/or relative to the connecting device 20) of the ephemeral gateway 50, the gateway selection unit 41 of the connecting device 20 can instruct the ephemeral gateway 50 and the luminaire devices 40 and/or the proxy device 44 to use the wormhole channel, connect to the multi-hop network via BLE and send messages for the cluster of luminaire devices 40 via that ephemeral gateway 50 rather than in the traditional way via the centralized multi-hop path from the connecting device 20 via the proxy device 44 to the cluster of luminaire devices 40. In this way, messages are sent in one possible way.

Another way to detect the ephemeral gateway 50 by the gateway discovery unit 43 could be based on information received at the connecting device 20 from the proxy device 44. When the proxy device 44 receives e.g. streaming commands via BLE (or other technology), it can inform the connecting device 20 to stop sending unicast messages over the multi-hop network (e.g. Zigbee) to prevent double traffic. Since the content of the Inter-PAN message is actually tunnelled in these messages (e.g. both on Zigbee as well as via the ephemeral gateway 50), any transition between the two paths would be totally seamless, since duplicate messages can be identified and discarded.

Yet another way to detect the ephemeral gateway 50 by the gateway discovery unit 43 could be based on information received at the connecting device 20 from the proxy device 44. E.g., when the proxy device 44 establishes a BLE connection to an ephemeral gateway 50, the proxy device 44 could inform the connecting device 20 about it; alternatively, the BLE connection established between the proxy device 44 and the ephemeral gateway 50 may allow the ephemeral gateway 50 to inform the connecting device 20 directly about its arrival and/or its wormhole capabilities (e.g. by including list of interfaces, etc.), via the multi-hop network; the act of connecting through BLE to a multi-hop network may automatically trigger the ephemeral gateway 50 to search for the connecting device 20, e.g. over Wi-Fi. The discovery of the wormhole opportunities may be simplified, if there are means of identifying the multiple interfaces of an ephemeral gateway or connecting device as being available to connect to the same network, e.g. providing description of one connection via another connection, using addresses over multiple interfaces that have a defined relationship (e.g. a part of the address is identical or derived in a known manner) or the network identifiers over multiple connections have a defined relationship (e.g. a part of the address is identical or derived in a known manner). Further, the establishment of the wormhole connection may be assisted by the connecting device 20 and the ephemeral gateway 50 exchanging information about the relevant devices, e.g. the ephemeral gateway 50 sharing a list of devices it can reach directly over BLE or the connecting device 20 instructing the ephemeral gateway 50 to discover some devices.

The gateway discovery unit 43 may determine the location of the ephemeral gateway 50 based on at least one of (a)

proxy beacon(s) having been observed by (potential) ephemeral gateway(s), a control action having been executed by a user of the (potential) ephemeral gateway(s), a result of a proximity detection amongst a (potential) ephemeral gateway and at least one target device or a proxy device, or an explicit user indication e.g. of the location. Proxy beacons are messages such as BLE advertisements which are sent by nodes in the network, or other equivalent messages (e.g. Zigbee beacons or Link Status messages). A potential ephemeral gateway can listen to those beacons, to determine which nodes are nearby, and their status. Proximity may e.g. be determined as being within (radio) range or within range and having a received signal strength indicator (RSSI) or link quality indicator above a predetermined threshold. This information (proximity and/or status) can be used by the potential ephemeral gateway, the connecting device 20, the proxy device 44 or one of the target devices 40 or another device, to determine which device to use as ephemeral gateway to send information to/from some nodes (or not to use such a gateway at all and use the existing network). To assist in this determination, the beacons may contain relevant information such as local network load, node characteristics such as available features and/or remaining capacity (processing, storage, networking, battery, etc), etc.

If the ephemeral gateway 50 is battery powered, an option to opt in/out of the proposed tunnelling or bypass service may be provided to the user.

If the ephemeral gateway 50 is a portable device, which could be removed from its current location, an option to opt in/out of the proposed tunnelling or bypass service may be provided to the user.

As another option, the gateway discovery unit 43 of the connecting device 20 may be adapted to detect a removal/disappearance of the ephemeral gateway 50 (both planned/announced and unplanned/silently).

Furthermore, the gateway discovery unit 43 of the connecting device 20 may be adapted to arbitrate between a number of available ephemeral gateways 50 (e.g. different smartphones (e.g. family members' smartphones) in an entertainment area or other potential gateway usage area of all present family members).

As a further option, two smartphones could be used as ephemeral gateways 50 in the same network. Both smartphones may be connected via a cellular communication channel (e.g. 5G), or Wi-Fi or BLE. Hence, as cellular communication channel to a base station has very low latency, it may be advantageous in some situations to send real-time data from the first smartphone (first ephemeral gateway) via the cellular communication channel to the second smartphone (second ephemeral gateway) in a different part of the service usage area (e.g. house or other entertainment area). The second smartphone may then establish the wormhole channel (e.g. via BLE or Inter-PAN signaling) and inject wormhole data locally in the lighting network or other target network. This may be also relevant for Augmented Reality applications where the lighting plays a role in a larger space such as an open plan office or tradeshow floor, or for a street lighting infrastructure to signal via a group of street lights (e.g. via multiple projection devices painting the upcoming path of the car) to pedestrians the intent of multiple autonomous cars being present in the same visible area.

The use of two or more ephemeral gateways 50 connected via a cellular communication provides the following advantages:

The cellular communication channel between the ephemeral gateways 50 provides an extended or enhanced bypass for a part of the (Zigbee) mesh network, which the connecting device 20 and the target devices (e.g. luminaire devices 40 of a target cluster) do not need to be aware of;

The bypass connections (wormhole channels) from the connecting device 20 to the ephemeral gateways 50 may each handle a part of the traffic and the ephemeral gateways may even be serving target devices in the same area by splitting the traffic load.

In case smartphones are used as ephemeral gateway 50 and the user moves with the smartphone to another location (e.g. another room in the home), the streaming can easily move along with the user since luminaire devices 30, 40 in the new location now come in range of the user when moving. The same applies for the above street lighting use case where the street lights signal to the user the intent of the autonomous cars. In this case, the autonomous cars and the smartphone may be connected to the same cellular network (e.g. 5G), while the street lights are connected to a cheaper network with low data rate such as narrowband Internet of Things (NB-IoT). With a traditional entertainment setup, the connecting device 20 would have to select one of the luminaire devices 40 in the new room as new proxy device 44, and setup a streaming in that cluster of luminaire devices 40 to replace streaming in the original room/cluster.

Another benefit of the usage of the ephemeral gateway 50 may be richness of experience. If the connecting device 20 controls all entertainment zones directly, it may need to reduce the control traffic flow (e.g. in terms of update frequency and/or number of bits to represent color or light intensity and/or number of lights to control independently per area, etc.). Or, if the connecting device 20 controls some entertainment zone via a hub (e.g. other connecting device) located several hops away, the same limitations may apply. Or, the connecting device 20 may have internal limitations how many messages it can dispatch towards the interface of the multi-hop mesh network (e.g. Zigbee) but does not have such limitations when the messages are sent over the Ethernet/Wi-Fi connection 100 to the ephemeral gateway 50.

Discovering the presence of the ephemeral gateway 50 by the gateway discovering unit 43 may allow the connecting device 20 to redirect some traffic through the ephemeral gateway 50, thus reducing the total amount of traffic in the multi-hop mesh network, and thus the connecting device 20 also may be able to boost the control traffic flow, for the newly re-directed entertainment area and/or for the other entertainment areas.

In a simple embodiment, the connecting device 20 and the ephemeral gateway(s) 50 can take advantage of the proxy devices 44 available in the network. In a more elaborate embodiment, the connecting device 20 may control the proxy behaviour of the nodes (e.g. luminaire devices 30, 40) via the multi-hop network (e.g. Zigbee), e.g., by enabling and disabling it.

It is however noted that the blocks shown in FIG. 4 may as well be provided in other network device, e.g. in one of the target devices 40, in the proxy device 44, in the ephemeral gateway 50 or another network device connected to the multi-hop network.

Figure 5:
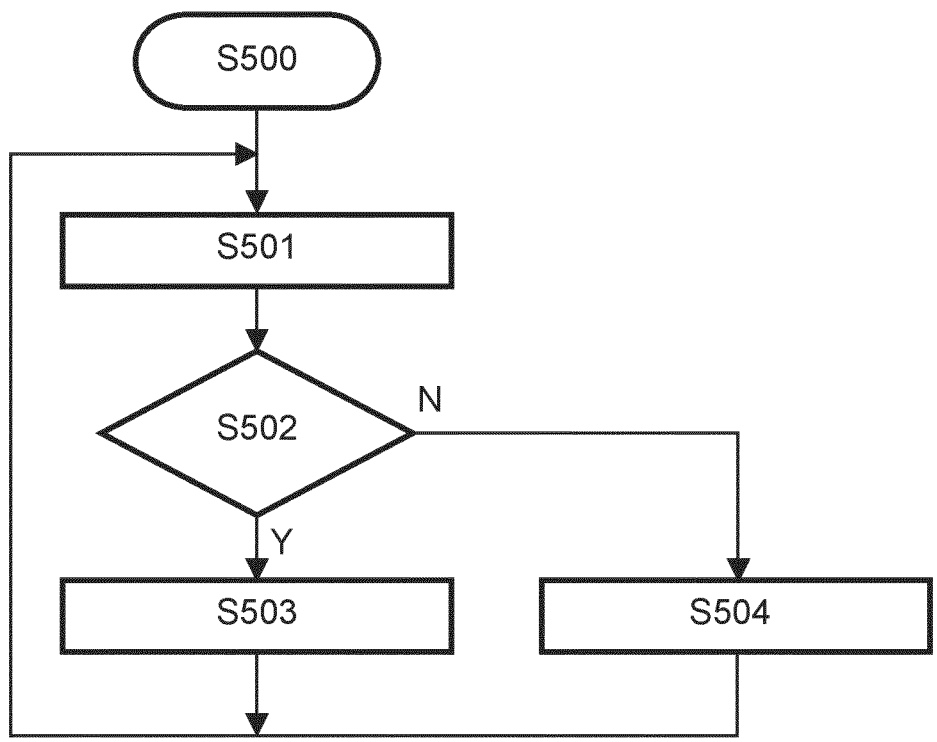
FIG. 5 shows a flow diagram of a gateway control procedure according to various embodiments.

FIG. 5 shows a summarizing flow diagram of a gateway control procedure (e.g. at the connecting device 20, the ephemeral gateway 50, the proxy device 44 or another network device) according to various embodiments.

The procedure starts at step S500 where the connecting device 20 is active or where a traffic-intense action, e.g. entertainment service or software update is requested by the entertainment source 10.

In step S501 a gateway discovery procedure is initiated to detect the availability (i.e. presence and/or location) of at least one ephemeral gateway 50 e.g. based on information obtained from potential ephemeral gateway(s) or from proxy device(s) 44 of the multi-hop network, as explained above.

Then, in step S502, the procedure checks and decides whether gateway usage is required for the present service or communication case. More specifically, a decision may be made for each broadcast message whether to use the legacy method via the multi-hop path along the luminaire devices 30 or the proposed new method via the ephemeral gateway(s) 50. Alternatively, the decision may be made for multiple messages, e.g., corresponding to a particular service (entertainment streaming), addressed at particular devices, for a given duration, etc.

The decision may be based on at least one of e.g. load of the multi-hop network (e.g. how full broadcast buffers in the nodes (e.g. luminaire devices 30) are or how many broadcasts have been sent recently), local busyness of the multi-hop network (e.g. for presence sensing or asset tracking), number of messages expected to be sent/in a unit of time, length of the messages, number of luminaire devices not supporting required features (e.g. combo radio devices for establishing a connection to the ephemeral gateway 50, or rebroadcasting capability etc.) in the cluster that needs to be controlled, number of target luminaire devices 40 within a one-hop range of the proxy device 44 (the same message could be sent from two proxy devices to cover a larger area), number of target luminaire devices 40 within one-hop range of the connecting device 20 (here the connecting device 20 could send the Inter-PAN messages itself, which has same latency as legacy broadcast), number of hops from a connecting device 20 to the at least one target device 40 or the proxy device 44, or importance of a message sent (e.g. if safety related, send the message both via the multi-hop legacy method and the new gateway method to maximize likelihood that the message is delivered).

If it is decided in step S502 to use the ephemeral gateway 50, the procedure branches off to step S504 and the data is bypassed via the ephemeral gateway 50 over the wormhole channel. If not, the procedure continues at step S503 and the data is forwarded via the conventional multi-hop path.

Finally, the procedure jumps back to step S501 and starts again.

Alternative to the pro-active establishment of the wormhole connection in step S501, even the search for the ephemeral gateway 50 may be conditional, e.g., dependent on the size of the cluster to control or the distance to that cluster.

In yet another alternative, the wormhole connection may be established reactively when an entertainment session is already ongoing, e.g. as a result of network congestion.

In yet another implementation, the decision to establish a wormhole connection may be triggered by a user.

In yet another implementation, the decision could be triggered by appearance of an ephemeral gateway (e.g. as announced) when an entertainment session is already ongoing.

In conventional systems, voice-controlled devices (e.g. voice assistants or voice controllers) communicate with the connecting device 20 (possibly through a cloud system). This all causes delay (i.e. latency). In case a cloud is involved, the reliability of the cloud connection can affect the performance. However, such voice-controlled devices are typically located in rooms/areas where target luminaire devices 40 to be controlled are located. Thus, the conventional way of integrating voice-controlled devices with the lighting system via the connecting device 20 is not efficient for latency as well as number of messages in the air (i.e. RF load).

In the following embodiment, voice-controlled devices or other directly connecting devices (e.g. mesh routers) can be used to establish the bypass or wormhole connection and thereby increase efficiency and reduce latency in connection with the use of voice-controlled or other devices that can establish a direct connection.

Figure 6:
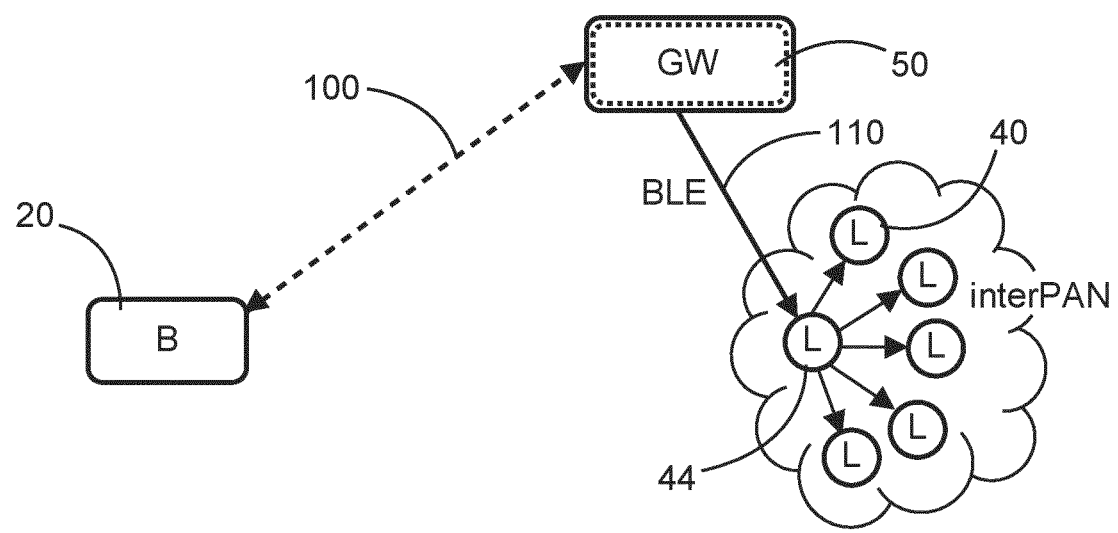
FIG. 6 shows a schematic architecture of a multi-hop lighting network with a voice-controlled system as temporary gateway according to a third embodiment.

FIG. 6 shows a schematic architecture of a multi-hop lighting network with a voice-controlled device (e.g. a voice controller or voice assistant (such as Google Home or Amazon Alexa)) as ephemeral gateway 50 according to a third embodiment. The voice-controlled or voice command device comprises a voice-user interface to allow spoken human interaction with devices (e.g. the luminaire devices 40) of the multi-hop network, using speech recognition to understand spoken commands and optionally answer questions that may lead to messages that need to be sent to the devices.

In the third embodiment, the voice-controlled device or system as ephemeral gateway 50 is adapted to control the luminaire devices 40 directly, e.g., it sends lighting commands via a single-hop connection 110 (e.g. over BLE) to the proxy device 44 which sends them in Inter-PAN messages to the cluster of luminaire devices 40 involved. Please note that only a single message of this format may need to be sent, unlike the stream of such messages used in the above entertainment cases.

As an alternative, a more generic proxy approach may be used where a Zigbee message (e.g. groupcast with scene recall) is packaged in BLE (i.e. Zigbee/BLE tunnel approach).

Yet another alternative mechanism is to use the BLE advertisements/messages 120 explained above in connection with the entertainment case of FIG. 3.

In all approaches, the voice-controlled device (functioning as the ephemeral gateway 50) can be informed about the luminaire devices 40, groups, scenes etc. as needed for the voice-user interface of the voice-controlled device as well as technical details how to control the luminaire devices 40 (e.g. Zigbee group addresses and scene ID's) by communicating with the connecting device 20 via the Ethernet or Wi-Fi connection 100 or by communicating with the devices (e.g. luminaire devices 40) to be controlled via a control mechanism using the single-hop connection 110 (e.g. BLE, Zigbee over BLE tunnel, etc.).

Optionally, the connecting device 20 may be informed about light commands issued by the voice-controlled device (ephemeral gateway 50) to the luminaire devices 40, so the connecting device 20 is aware of the current state of the luminaire devices 40 (which is faster and more efficient than polling the luminaire states). To achieve this, the connecting device 20 can be informed by the voice device directly, or it can receive the status change reports from the luminaire devices 40 via the multi-hop network (e.g. Zigbee).

A similar use case may be a warehouse application, where a forklift driver carries a permanently-on voice-controlled device (e.g. voice assistant device) and may use this to tell the system his intent (e.g. "I will now drive to isle B"). The voice-controlled device on the forklift then warns other warehouse workers present in adjacent spaces via signals transmitted by surrounding luminaire devices of the approaching forklift. In the case of autonomous forklifts or moving robots, an upcoming manoeuvre can be communicated to humans present in the space.

In manufacturing, reliable low latency communication may be disturbed due to the presence or movement of metal objects and interference by manufacturing processes (e.g. welding in a car plant disturbs wireless communication). Hence, the proposed local communication without a round trip to the 'normal' gateway (e.g. connecting device 20) is desired to ensure low latency.

As another aspect, groupcast and broadcast messages in multi-hop mesh networks (such as Zigbee and Wi-Fi) may have the disadvantage that each message typically is rebroadcast by every node. For large networks, this leads to a very large network load which may even limit the possible size of the network in order to guarantee certain performance requirements (unless specific measures are taken such as disabling rebroadcast on some of the nodes). For example, if ten luminaire devices are to be addressed in a network of fifty nodes in a certain room which is two hops away from the connecting device, one can either send (as network level messages) ten unicast messages (taking up twenty transmissions) or one broadcast/groupcast message (taking up at least fifty transmissions or even more depending on the passive acknowledgement strategy of the nodes).

However, the number of broadcasts is limited due to the size of buffers in the devices and requirements in the network specifications to cope with very spread-out networks, which limits the freedom of sending of messages. Even if on average this limit is kept, peak excursions may lead to either delayed or lost messages.

The unicast approach may be favourable in number of transmissions but has the application disadvantage that all the involved luminaire devices receive the message one by one ("popcorn effect").

Another aspect is that broadcast "just works" and no pre-establishment of any type of information or topology knowledge is required. It is also immune to topology changes. For unicast communication to work, the unicast route must be in place (which may require a prior route discovery broadcast). If the route is not in place at the time a command will be sent (depending on the application request to the underlying stack) the route discovery broadcast may be performed upon reception of the request to send the frame from next higher layer, thus potentially interfering with unicast transmissions for other devices and leading to a much longer overall execution delay for the device for which the route was not present and to a larger number of messages on the network.

Note that a previously established route can be broken due to nodes being absent from the network (e.g. due to power down or breaking) and/or due to changing propagation conditions (metal door closed), interference (streaming session started in one corner of the network) and they are not repaired proactively (when the problem occurs) but reactively (when the next frame using this route needs to be sent).

For example, in case of a hardware problem with a driver of one of the luminaire devices 40, a history of energy consumption may be required. Pushing that amount of data across multiple hops to the connecting device 20 can be a burden for the network.

In another example, due to network performance problems, it may be necessary to read out statistics collected in a diagnostics cluster of some or all of the luminaire devices 40, to identify the probable cause of the problems. Pushing large amounts of data in case of an already aggravated network traffic situation may result not only in further degradation of the network, but also the probability of receiving the requested information is low.

In the above cases, the wormhole connection could be used in the upstream direction, i.e. for the luminaire devices 40 to report to the connecting device 20, e.g., to push this diagnostic or energy consumption data.

Figure 7:
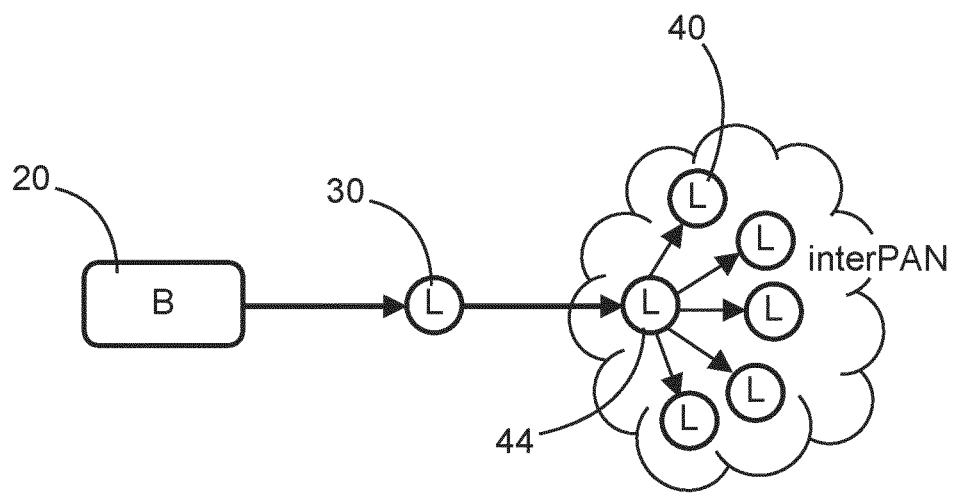
FIG. 7 shows a schematic architecture of a multi-hop lighting network with a proxy device as temporary gateway according to a fourth embodiment.

FIG. 7 shows a schematic architecture of a multi-hop lighting network with a proxy device as ephemeral gateway according to a fourth embodiment.

In the fourth embodiment, a combination of unicast and proxy-based single-hop transmission (e.g. inter-PAN) is proposed as an alternative to the above conventional broadcast concept. The connecting device 20 packages the light control commands and sends them via a unicast message to the proxy device 44 which spreads the unicast message e.g. via Inter-PAN to the luminaire devices 40 that need to receive it (e.g. in a room).

For the above example, this would lead to only three Zigbee transmissions, i.e., two for the unicast message to the proxy device 44 and one for the Inter-PAN message. A significant reduction over the above two legacy unicast/broadcast alternatives.

The role of the proxy device 44 can be a static role, e.g. given their physical location (which other devices can be reached through them) or their capabilities (e.g. special hardware/software required).

The proxy device 44 can also be appointed dynamically, depending on the current network topology (e.g. taking into account the current location of portable devices).

There may be multiple ones of the proxy device 44 in the network.

As a further option, assuming that a communication content that the connecting device 20 pushes into the multi-hop network actually comes from a cloud or the Internet, then the cloud or the Internet could select at least one of a plurality of available ephemeral gateways (e.g. depending on their location) to best deliver the communication content to the cluster of target luminaire devices 40.

Even if the connecting device 20 would like to deliver a broadcast message to the entire network, it can still send it as a number of proxied messages via proxy devices, such as the proxy device 44.

Given the above example of a network with fifty nodes, if the fifty nodes can be grouped in three groups of each five nodes at one-hop distance from the connecting device 20 and seven groups of five nodes each at two-hop distance from the connecting device 20, the total number of network-level messages would be three unicast messages and three one-hop broadcast messages plus fourteen (seven times two) unicast messages and seven one-hop broadcast messages, i.e. twenty-seven messages in total (compared to at least fifty messages in case of the above conventional broadcast approach).

Furthermore, the connecting device 20 may want to influence a bypass or wormhole topology, e.g. by explicitly instructing the ephemeral gateway 50 through which proxy device it should connect via BLE into the network. For that decision, it could also take neighbor tables of the proxy devices into account, e.g., to prevent overlap. Then, messages arriving at a luminaire device 40 through multiple ways (e.g. directly from the connecting device 20 via the multi-hop network and via a wormhole connection through the proxy device 44 or from two proxy devices via two wormhole connections) may need to allow for identifying them as one and the same message, to allow for deduplication (i.e. limit the processing load), but also to avoid adverse effects, especially in case of relative commands (e.g. toggle, step up). This can be achieved e.g. by identifying the messages travelling through those multiple channels as part of the same service and providing them with a linkable sequence number.

Furthermore, the connecting device 20 may further need to control the proxy behaviour, e.g. enable other interface(s) on a node in a strategic position. The node could be a neighbour node of the node of interest, or the node of interest itself. By specifying the task for the proxy device 44, the connecting device 20 limits the amount of data that the proxy device 44 can send (expose) over the other interface(s).

The same concept can be used for sending large amounts of data to devices, e.g. changing a number of bindings and scenes on the device, or performing software update (Over the Air Update (OTAU)). If the commands/messages are unique per device, the proxy device 44 as ephemeral gateway can use unicast to each of the nodes in the area. If the commands/messages are shared between multiple devices, it can use the Inter-PAN mechanism (or groupcast with radius 1).

In various ones of the above embodiments, the connecting device 20 may be able to discover proxy capabilities of the nodes (e.g. luminaire devices 30, 40) in the vicinity of a node of interest.

As an alternative to the above-mentioned beacon approach where a potential ephemeral gateway detects the nodes (e.g. luminaire devices 40), a node itself could detect the presence of a potential ephemeral gateway and notify the connecting device 20, or the connecting device 20 could detect the presence of the ephemeral gateway 50.

The connection 100 between the connecting device 20 and the ephemeral gateway 50 may be a Wi-Fi or BLE connection, 5G connection, UWB connection. However, other "helper" devices could be connected via Ethernet (or Power over Ethernet (PoE)) and located near the target devices (e.g. target luminaire devices 40 or proxy device 44) and used as the ephemeral gateway 50.

If the connection 100 between the connecting device 20 and the ephemeral gateway 50 is a BLE connection, there could be two BLE connections, one between the connecting device 20 and the ephemeral gateway 50 and one between the ephemeral gateway 50 and the target devices 40 or the proxy device 44, which could be optimized into a single BLE connection between the connecting device 20 and the target/proxy devices 40/44.

With the various embodiments, lower latency (better synchronisation) and/or lower occupation of the multi-hop network can be achieved, which becomes especially important when all functional luminaire devices 30, 40 become connected (e.g. the average US house has forty-five luminaire devices) and in addition new decorative lighting and more spatially distributed user interface buttons are provided. Using Ethernet/Wi-Fi and/or BLE and/or other network technology for the wormhole channel via the ephemeral gateway means that less messages are sent via the multi-hop network or are sent over shorter distances only, so that more (other) messages can fit on the multi-hop network, e.g. light control for the remaining lights. Moreover, multiple entertainment sessions can be enabled in parallel (in different areas of the home).

To summarize, a Zigbee or other multi-hop network can become a bottleneck for certain applications, e.g. entertainment streaming to (multiple) areas in the areas (e.g. at home) where hopping is needed. By utilizing an ephemeral gateway 50 present right in a data-hungry area, the overall performance across the network can be improved. Using this ephemeral gateway 50, (part of) the data can be routed directly to/from the destination/source nodes 10, 40 thus freeing up capacity in the remainder of the network. The connection between the ephemeral gateway 50 and the proxy device 44 or target devices 40 could be any type of single-hop broadcast or other direct communication to the target device(s) 40 or target cluster.

While the invention has been illustrated and described in detail in the drawings and foregoing description, such illustration and description are to be considered illustrative or exemplary and not restrictive. The invention is not limited to the disclosed embodiments. The proposed connection establishment procedures can be applied to and possibly standardized in other types of multi-hop networks and with other types of messages and single-hop connections. Moreover, the invention can be applied in any product or system that provides access to a multi-hop network (e.g. Zigbee or others) via single-hop connection (e.g. BLE or others).

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 5 or those performed by the devices or blocks or units of FIGS. 2, 3, 4, 6 and 7 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus comprised in a connecting device for establishing a connection to at least one target device in a multi-hop network the apparatus comprising:
  a discovery processor for detecting availability of at least one temporary gateway capable of connecting, using another network technology different from the multi-hop network to the connecting device and via a single-hop Bluetooth Low Energy (BLE) connection, to at least one target device or a proxy device, wherein the proxy device is adapted to provide access to the at least one target device located within a one-hop range of the proxy device, wherein the at least one temporary gateway connects via the single-hop connection to the at least one target device or the proxy device, wherein the connecting device transmits a command to the at least one temporary gateway via an Ethernet connection or a Wi-Fi connection, and wherein the single hop connection between the at least one temporary gateway transmits the command to and the at least one of a target device or a proxy device via the single-hop BLE connection, wherein the discovery processor is adapted to detect the availability of the at least one temporary gateway based on information communicated to the discovery processor indicative of at least one of: a proxy beacon having been observed by the temporary gateway, a control action having been executed by a user of the temporary gateway, a result of a proximity detection amongst the temporary gateway and at least one target device or the proxy device, or an explicit user indication; and a selection processor for deciding either to establish a bypass connection via a selected one of the at least one temporary gateway to the at least one target device or the proxy device, or to establish a connection to the at least one target device or the proxy device through the multi-hop network, in dependence on at least one network or device-related parameter.

2. The apparatus of claim 1, wherein the apparatus activates a combo device, providing both single-hop and multi-hop connectivity, as the proxy device, and wherein the proxy device is located near the at least one target device for assisting in the connecting to the at least one target device.

3. The apparatus of claim 1, wherein the apparatus is adapted to control the selected temporary gateway to take over functions of the proxy device and send and/or receive single-hop messages to/from the at least one target device.

4. The apparatus of claim 1, wherein the apparatus is adapted to control the selected temporary gateway to package commands received from the connecting device in broadcast or unicast messages to be used as the single-hop messages.

5. The apparatus of claim 1, wherein the apparatus is adapted to change the role of the at least one target device to become an end device of the multi-hop network or to enable the at least one target device with a single-hop connectivity during a session of the bypass connection.

6. The apparatus of claim 1, wherein the apparatus is adapted to instruct:
the selected temporary gateway and the at least one target device or
the selected temporary gateway, the proxy device and the at least one target device to use the bypass connection and exchange messages via the selected temporary gateway.

7. The apparatus of claim 1, wherein the selection processor is adapted to select a first cellular network device as the selected temporary gateway and use a second cellular network device having a single-hop connection to the at least one target device for establishing the bypass connection, wherein the first cellular network device and the second cellular network device are connected via a cellular communication channel.

8. The apparatus of claim 1, wherein the selection processor is adapted to decide in dependence on at least one of: network load of the multi-hop network, local busyness of the multi-hop network at the at least one target device, number of network devices not supporting required features in cluster comprising the at least one target device, number of messages expected to be sent in a unit of time, length of the messages, number of target devices within a one-hop range of the proxy device, number of target devices within a one-hop range of the connecting device, number of hops from the connecting device to the at least one target device or the proxy device, or importance of a message to be sent over the connection to be established.

9. The apparatus of claim 1, wherein the discovery processor is adapted to select a voice-controlled device or a mesh router as the selected temporary gateway, and to inform the voice-controlled device or the mesh router about the at least one target device and technical details how to control the at least one target device.

10. The apparatus of claim 1, wherein the apparatus is adapted to select a proxy device as the selected temporary gateway, to package and send control commands in a single unicast message to the proxy device, and to control the proxy device to spread the unicast message via a single-hop transmission to the at least one target device.

11. The apparatus of claim 1, wherein the at least one temporary gateway comprises two temporary gateways wirelessly connected via a cellular connection.

12. A method carried out by an apparatus comprised in a connecting device for establishing a connection to at least one target device in a multi-hop network, the method comprising:
detecting, by a discovery unit, availability of at least one temporary gateway capable of connecting using another network technology different from the multi-hop network to the connecting device and via a single-hop Bluetooth Low Energy (BLE) connection to at least one target device or a proxy device, wherein the proxy device is adapted to provide access to the at least one target device located within a one-hop range of the proxy device, wherein the at least one temporary gateway connects via the single-hop connection to the at least one target device or the proxy device, wherein the connecting device is transmits a command to the at least one temporary gateway via an Ethernet connection or a Wi-Fi connection, and wherein the at least one temporary gateway transmits the command to the at least one of a the target device or a proxy device via the single-hop BLE connection, wherein the discovery unit is adapted to detect the availability of the at least one temporary gateway based on information communicated to the discovery unit indicative of at least one of: a proxy beacon having been observed by the temporary gateway, a control action having been executed by a user of the temporary gateway, a result of a proximity detection amongst the temporary gateway and at least one target device or the proxy device, or an explicit user indication; and
deciding, by a selection unit, either to establish a bypass connection via a selected one of the at least one temporary gateway to the at least one target device or the proxy device, or to establish a connection to the at least one target device or the proxy device through the multi- hop network, in dependence on at least one network or device-related parameter.

13. The method of claim 12, wherein the at least one temporary gateway comprises two temporary gateways wirelessly connected via a cellular connection.

14. A non-transitory computer readable medium comprising instructions that when executed by a computer device cause the computer device to perform the method of claim 12.

* * * * *